June 2, 1925.　　　　　　　　　　　　　　　　　　　　1,540,568
J. E. REBOURS
AUTOMOBILE TRUNK AND EQUIPMENT THEREFOR
Filed Sept. 15, 1923　　　2 Sheets-Sheet 1

Witness:
Geo. L. Chapel

Inventor:
Jules E. Rebours
by Cyrus W. Rice
Attorney.

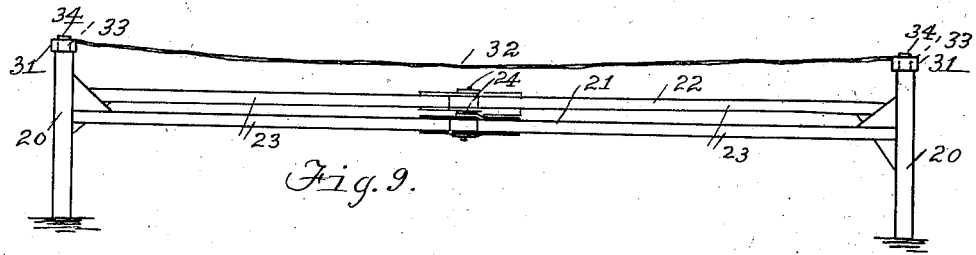
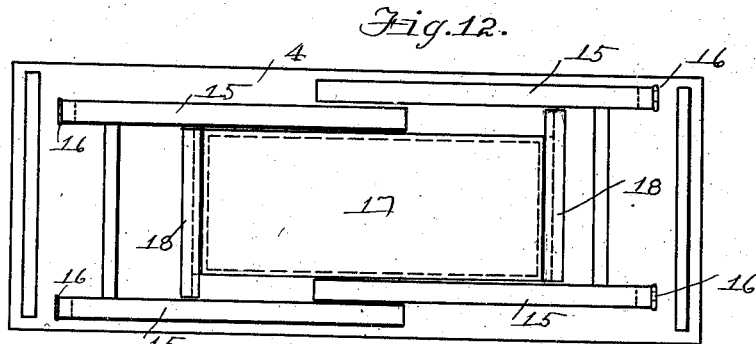
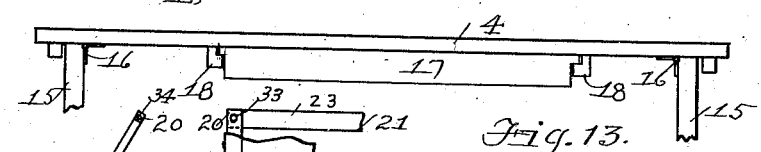
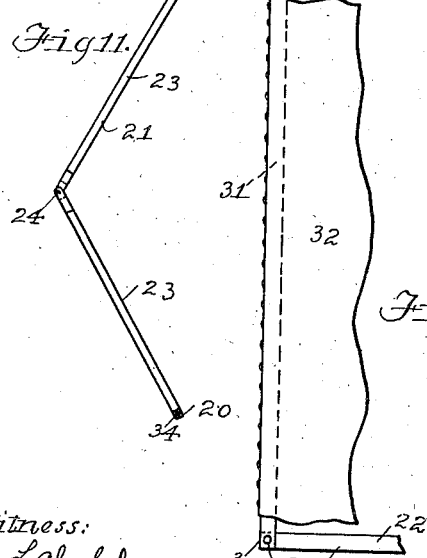
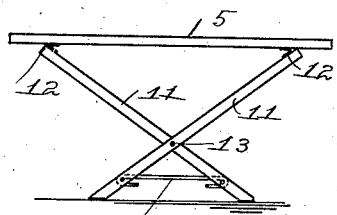

Patented June 2, 1925.

1,540,568

UNITED STATES PATENT OFFICE.

JULES E. REBOURS, OF GRAND RAPIDS, MICHIGAN.

AUTOMOBILE TRUNK AND EQUIPMENT THEREFOR.

Application filed September 15, 1923. Serial No. 662,798.

*To all whom it may concern:*

Be it known that I, JULES E. REBOURS, a citizen of the United States, residing at Grand Rapids, in the county of Kent and State of Michigan, have invented new and useful Improvements in Automobile Trunks and Equipment Therefor, of which the following is a specification.

The present invention relates to trunks or boxes, adapted to be mounted on or carried by automobiles and the like, and to the equipment for said trunks or boxes; and its object is to provide such a box or trunk whose side or end walls are removable and are furnished with folding legs adapted to support said walls horizontally when removed from the rest of the structure, and to thus form tables, seats and the like; a further object being to provide a bed whose frame may be compactly folded and inserted into such a box or trunk.

This and any other objects hereinafter appearing are attained by, and the invention finds preferable embodiment in, the structure or structures hereinafter particularly described in the body of this specification and illustrated by the accompanying drawings, in which:—

Figure 9 is a side view of said bed in operative or usable position;

Figure 10 is a top plan view of an end portion thereof;

Figure 11 is a top plan view of a pair of posts of the bed and their connecting side rail;

Figure 12 is an inner side view of the removed rear wall of the trunk;

Figure 13 is an edgewise view of the same, showing it in table-forming position; and Figure 14 is an end view of one of the removed end walls of the trunk, showing it in seat-forming position.

Figure 1:
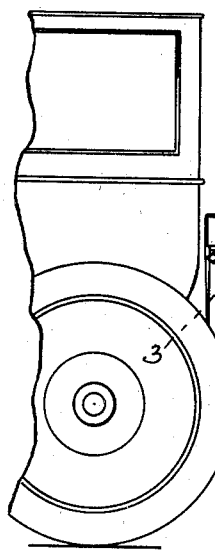
Figure 1 is a left hand side view of the rear portion of an automobile showing my improved box or trunk carried thereby.
Figure 2:
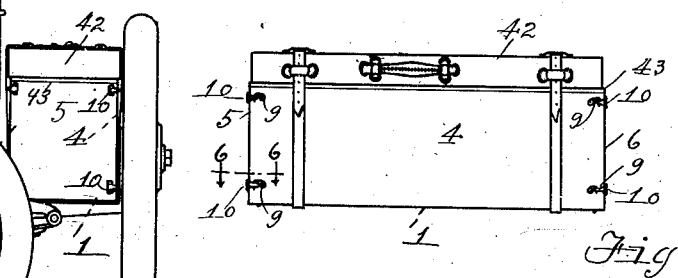
Figure 2 is a rear view of said trunk or box.
Figure 3:
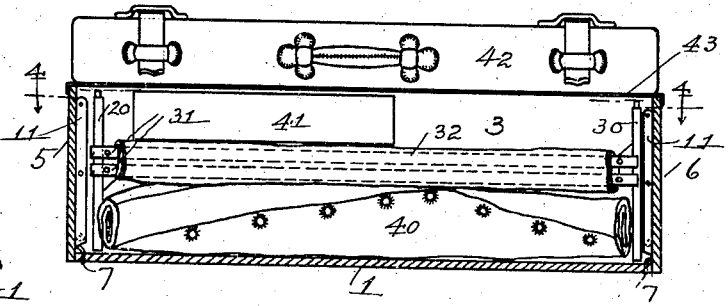
Figure 3 is a sectional view of the same taken on a vertical plane corresponding to line 3—3 of Figure 4.
Figure 5:
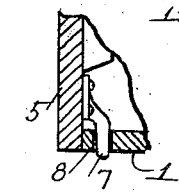
Figure 5 is a fragmentary view of a portion thereof sectioned on line 3—3 of Figure 4.

In the embodiment of the invention chosen for illustration by the accompanying drawings and for detailed description in the body of this specification, my improved box or trunk is shown in Figure 1 mounted at the rear of an automobile. This box has a bottom 1, side wall 3, rear side wall 4 and adjacent end walls 5, 6. The rear side wall and the end walls are removably mounted, so that they may be removed from the rest of the box or structure and used for the purposes hereinafter explained. To effect this removable mounting, the end walls 5, 6 are provided with hooks 7 adjacent their lower edges adapted to engage in keepers or sockets 8 in the bottom 1 of the box, as particularly shown in Figure 5. By means of this construction the end walls 5, 6 may be swung outwardly at their upper edges to draw these hooks 7 out of their keepers or sockets 8. The rear side wall 4 is detachably connected with the adjacent end walls 5, 6 respectively by latches 9 pivotally mounted on the rear wall and adapted to holdingly engage the keepers 10 carried by the end walls 5, 6, as particularly shown in Figures 6 and 7.

These end walls 5, 6 are provided on their inner sides with folding legs 11 hingedly mounted thereon at 12 as seen in Figure 14 and adapted to be swung away from the under side of said end walls, whereupon pins 13 may be inserted into holes in the legs or double hooks 14 may be applied to hold these legs in position to support the end walls horizontally (as shown in Figure 14) whereupon said end walls may serve as seats or chairs. The rear side wall 4 is likewise provided on its inner side with folding legs 15 hingedly mounted thereon at 16 as seen in Figures 12 and 13 and adapted to be swung to the position seen in Figure 13, whereupon this rear side wall, being supported horizontally, may serve as a table.

This rear side wall 4 has on its inner (i. e., its under side in its table-forming position shown in Figure 13) a drawer 17 slidably mounted in guides 18 and so positioned between the folded legs as to be held thereby against opening movement as seen in Figure 12.

Figures 4, 6, 7, 8:
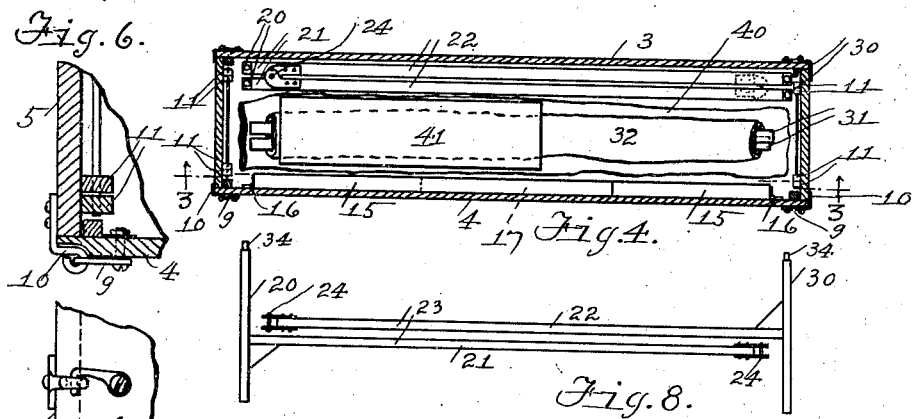
Figure 4 is a sectional view of the same taken on a horizontal plane corresponding to line 4—4 of Figure 3.
Figure 6 is a fragmentary view of a portion of the trunk sectioned on line 6—6 of Figure 2.
Figure 7 is a rear view of the same portion of the trunk.
Figure 8 is a side view of parts of the frame of a bed with which the trunk is equipped.

I provide, as a part of the equipment of the box or trunk, a bed adapted to be compactly folded and inserted into the box. This bed has a bed frame comprising two pairs of upright posts 20, 30 each pair being connected by a side rail 21 or 22 having portions 23, hingedly-connected at 24 so that they may be compactly folded together in parallel relation as shown in Figures 4 and 8. It will be seen that inasmuch as the upper surface of one side rail 21 connecting one pair of the posts 20 is in a lower plane than the lower surface of the other side rail 22 connecting the other pair of posts 30, the pairs of posts and their connecting side rails may be compactly positioned in the box or trunk, as seen in Figure 4, thus economizing space. Transversely extending bars 31 respectively carrying the opposite ends of a flexible sheet 32 connect the side rails together, the sockets 33 at the opposite ends of these bars receiving removably the upper ends 34 of one of each pair of posts, viz, one post 20 and one post 30.

My box or trunk affords space for receiving various articles, such as a tent 40, a camp stove indicated at 41, and the like.

It will be seen that my box or trunk and its said equipment provides in very compact form camping furniture adapted for automobile touring and the like. A suit case 42 may be strapped on the top of the box or trunk and a cover 43 may be applied beneath it, as shown.

The invention being intended to be pointed out in the claim, is not to be limited to or by details of construction of the particular embodiment or embodiments thereof illustrated by the drawings or hereinbefore shown or described.

I claim:

In a structure of the character described: a box having removably mounted adjacent walls, at least one of which is provided on its inner side with a slidable drawer and with folding legs adapted in their operative position to support said wall horizontally when removed from the rest of the structure, the drawer being so positioned between the folded legs as to be held thereby against opening movement.

In testimony whereof I have hereunto set my hand at Grand Rapids, Michigan, this 11th day of September, 1923.

JULES E. REBOURS.